(12) United States Patent
Hasegawa

(10) Patent No.: US 8,270,072 B2
(45) Date of Patent: Sep. 18, 2012

(54) MICROSCOPE HAVING AN OPTICAL-ELEMENT SWITCHING OPERATION UNIT CONFIGURED TO ROTATE A MOVABLE ELEMENT EQUIPPED WITH A PLURALITY OF OPTICAL ELEMENTS BY A SINGLE TRANSLATORY OPERATION

(75) Inventor: Kazuhiro Hasegawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 401 days.

(21) Appl. No.: 12/497,058

(22) Filed: Jul. 2, 2009

(65) Prior Publication Data

US 2010/0002290 A1 Jan. 7, 2010

(30) Foreign Application Priority Data

Jul. 4, 2008 (JP) .................................. 2008-175584
Jun. 2, 2009 (JP) .................................. 2009-133451

(51) Int. Cl.
*G02B 21/02* (2006.01)
(52) U.S. Cl. ....................................................... 359/381
(58) Field of Classification Search .................... 359/381
See application file for complete search history.

(56) References Cited

U.S. PATENT DOCUMENTS

| 2,264,835 | A | * | 12/1941 | Flint | 359/381 |
| 4,726,653 | A | * | 2/1988 | Thaler et al. | 359/467 |
| 5,867,310 | A | | 2/1999 | Hasegawa | |
| 6,359,731 | B1 | * | 3/2002 | Koyama | 359/381 |
| 2005/0195475 | A1 | * | 9/2005 | Obuchi | 359/383 |
| 2011/0063724 | A1 | * | 3/2011 | Hasegawa | 359/381 |

FOREIGN PATENT DOCUMENTS

| JP | 57-23244 A | 2/1982 |
| JP | 8-220443 A | 8/1996 |

* cited by examiner

*Primary Examiner* — Derek S Chapel
(74) *Attorney, Agent, or Firm* — Holtz, Holtz, Goodman & Chick, PC

(57) ABSTRACT

A microscope includes a microscope main body, a revolving nosepiece rotatably mounted on the microscope main body and equipped with plural objective lenses, and focusing handles that adjust focal points of the objective lenses. The microscope further includes operation knobs mounted in a vicinity of the focusing handles and configured to move by a predetermined amount in a predetermined directions and an operating-force transmitting mechanism provided between the operation knobs and the revolving nosepiece and configured to transmit, when the operation knobs move, operating force to the revolving nosepiece to cause the movable member to move so that the objective lenses can be switched from one to the other through a single moving operation of the operation knobs by the predetermined amount.

8 Claims, 17 Drawing Sheets

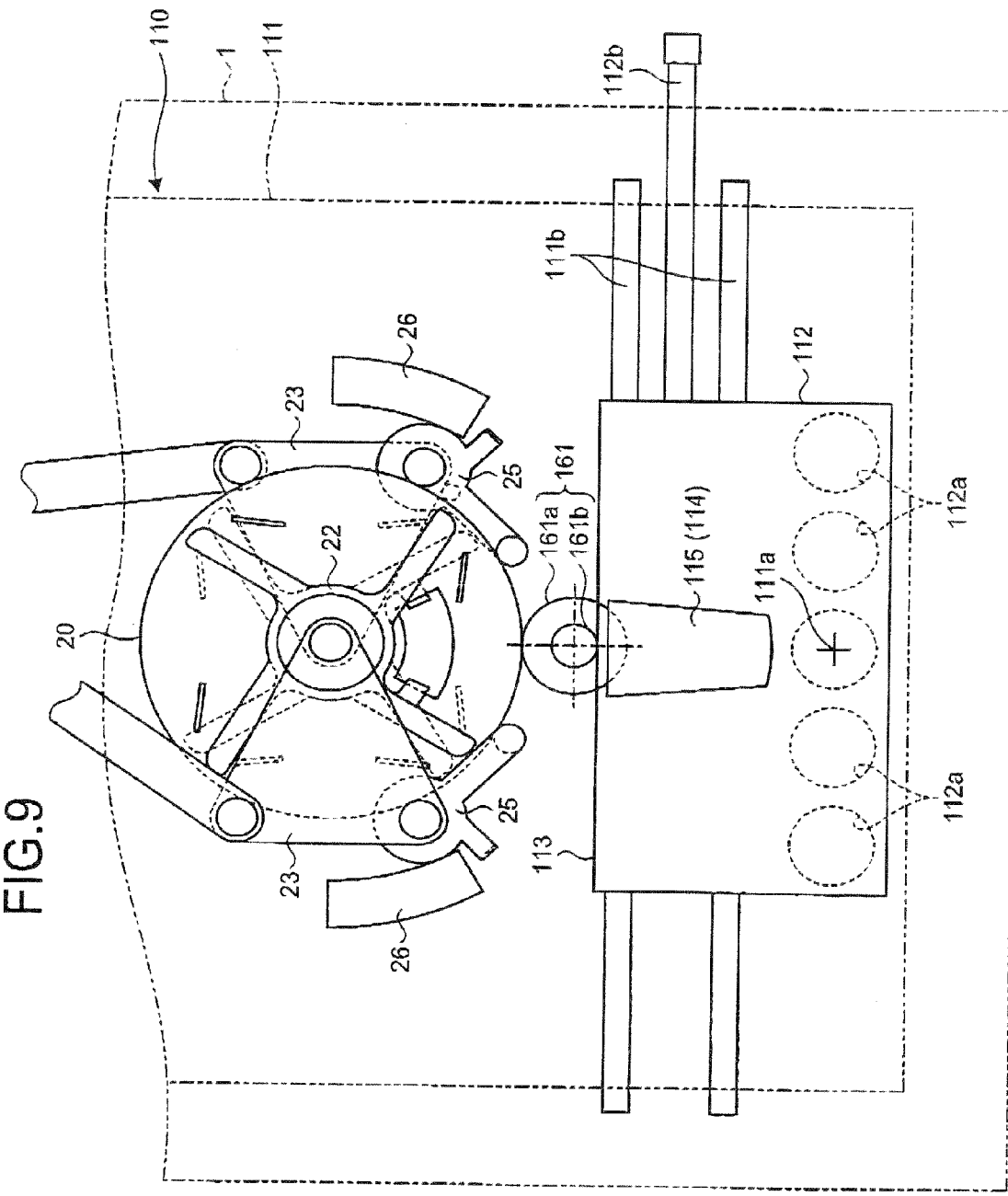

MICROSCOPE HAVING AN OPTICAL-ELEMENT SWITCHING OPERATION UNIT CONFIGURED TO ROTATE A MOVABLE ELEMENT EQUIPPED WITH A PLURALITY OF OPTICAL ELEMENTS BY A SINGLE TRANSLATORY OPERATION

CROSS-REFERENCE TO RELATED APPLICATIONS

This application is based upon and claims the benefit of priority from Japanese Patent Application No. 2008-175584, filed on Jul. 4, 2008, and Japanese Patent Application No. 2009-133451, filed on Jun. 2, 2009, the entire contents of which are incorporated herein by reference.

BACKGROUND OF THE INVENTION

1. Field of the Invention

The present invention relates to a microscope capable of switching optical elements, such as objective lenses, from one to the other without disturbing operation posture for a focusing handle and a stage handle by operating an operation lever mounted near either the focusing handle or the stage handle.

2. Description of the Related Art

A microscope revolving nosepiece capable of switching objective lenses from one to the other without disturbing operation posture for a focusing handle has been developed. Such a revolving nosepiece includes a revolving-nosepiece body fixed to an underside of a lens barrel, a revolving-nosepiece rotating unit rotatably mounted on the revolving-nosepiece body and equipped with plural objective lenses, a knob arranged at a position near a focusing handle and distant from the revolving-nosepiece rotating unit and through which switching operation of the objective lenses is exerted, and a transmitting unit arranged between the knob and the revolving-nosepiece rotating unit and configured to transmit the switching operation of the objective lenses exerted through the knob to the revolving-nosepiece rotating unit.

The transmitting unit includes a rotation axis provided with the knob mounted on an end thereof, a drive pulley mounted on a base end side of the rotation axis, a driven pulley mounted on the revolving-nosepiece rotating unit, and a belt wound around the drive pulley and the driven pulley. Therefore, switching operation of the objective lenses is entered from the knob as rotation operation, and the entry of the rotation operation is transmitted from the drive pulley to the revolving-nosepiece rotating unit via the belt (see Japanese Patent Application Laid-open No. H8-220443).

Meanwhile, a microscope configured to switch objective lenses from one to the other by manual operation includes a click mechanism arranged between a revolving-nosepiece body and a revolving-nosepiece rotating unit so that the objective lenses can be accurately set (positioned) at stop positions. As shown in FIG. 5, a click mechanism 14 includes, for example, a click 15 mounted on the revolving-nosepiece body and a ball 16 mounted on the revolving-nosepiece rotating unit 12. The click 15 is a leaf spring mounted on a top surface of the revolving-nosepiece body and is structured such that both side edges 15a are obliquely bent so that the ball 16 can be put in from both sides and a groove 15b in which the ball 16 is to be fitted is arranged in the center of the click 15. The ball 16 is a hemispherical projection formed on a top surface of the revolving-nosepiece rotating unit 12 so as to correspond to the stop positions (switch positions) of the objective lenses. When the objective lenses are switched from one to the other, the ball 16 that has been fitted in the groove 15b of the click 15 is released from the groove 15b of the click 15, and then the ball 16 coming next is put in the click and fitted in the groove 15b of the click 15.

The microscope including the knob mounted near the focusing handle as described above is structured so that the objective lenses can be switched from one to the other by manual operation. Therefore, this microscope also includes the click mechanism 14. Thus, when the objective lenses are switched from one to the other by rotating the knob, the ball 16 that has been fitted in the groove 15b of the click 15 is released from the groove 15b of the click 15, and then the ball 16 coming next is put in the click 15 and fitted in the groove 15b of the click 15.

SUMMARY OF THE INVENTION

A microscope according to an aspect of the present invention includes: a microscope main body; a movable member movably mounted on the microscope main body and equipped with a plurality of optical elements; a focusing operating unit that adjusts focal points of the optical elements; an optical-element switching operating unit mounted in a vicinity of the focusing operating unit and configured to move by a predetermined amount in a predetermined direction; and an operating-force transmitting mechanism provided between the optical-element switching operating unit and the movable member and configured to transmit, when the optical-element switching operating unit moves, an operating force to the movable member to move the movable member such that the optical elements are switched from one to the other through a single moving operation of the optical-element switching operating unit by the predetermined amount.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a plan view of a revolving nosepiece of a microscope according to a second embodiment of the present invention;

DETAILED DESCRIPTION OF THE PREFERRED EMBODIMENTS

Exemplary embodiments of a microscope according to the present invention will be described in detail below with reference to the accompanying drawings. The present invention is not limited to the following embodiments.

First Embodiment

A first embodiment of the present invention will be described below using an example in which an optical-element switching device of a microscope is applied to a revolving nosepiece.

Figure 1:
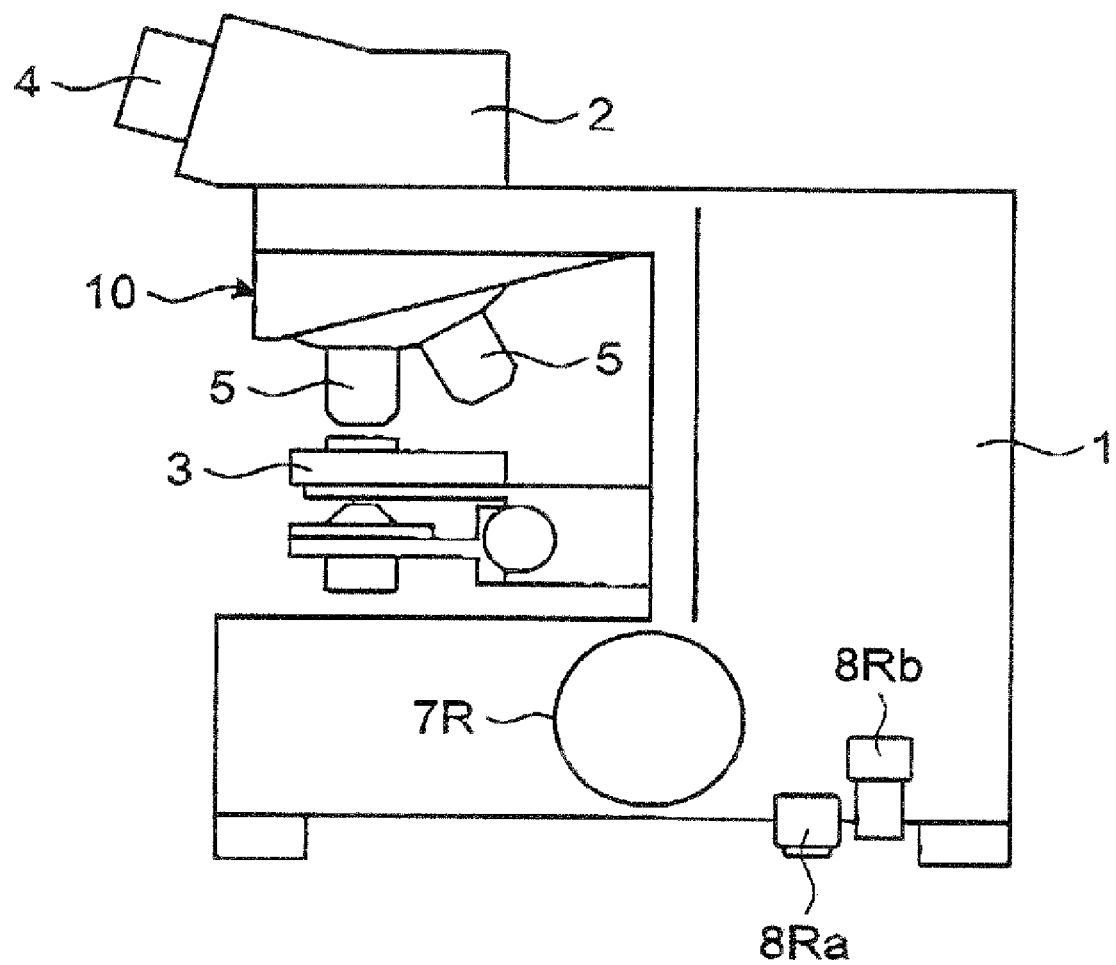
FIG. 1 is a right side view of a microscope according to a first embodiment of the present invention.
Figure 2:
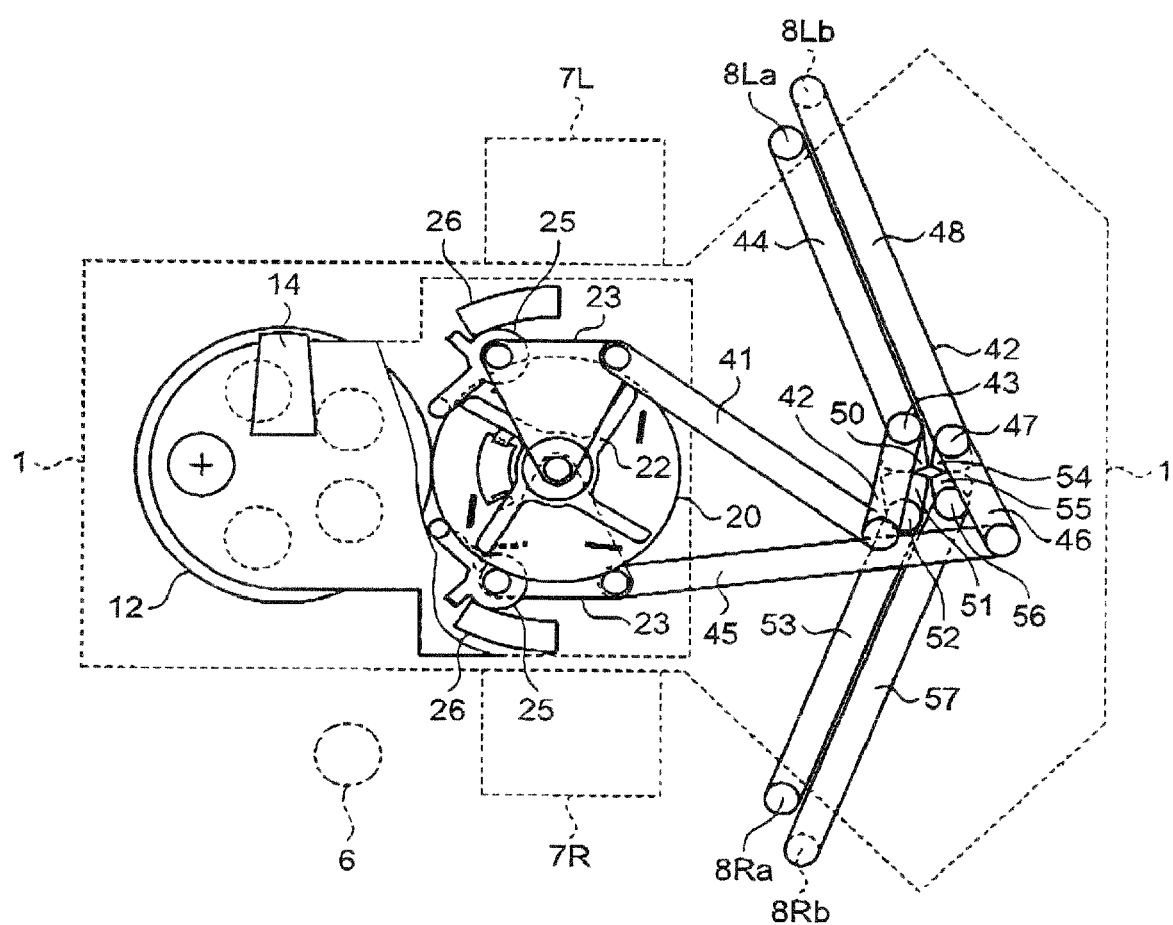
FIG. 2 is a plan view of the microscope according to the first embodiment.

An overview of a microscope according to the first embodiment is described below with reference to FIGS. 1 and 2. FIG. 1 is a right side view of the microscope according to the first embodiment. FIG. 2 is a plan view of the microscope according to the first embodiment.

As shown in FIGS. 1 and 2, the microscope in which the optical-element switching device is applied to a revolving nosepiece 10 includes a microscope main body 1, a lens barrel 2, and a stage 3. The lens barrel 2 is mounted on an end portion of an arm of the microscope main body 1 to enable observation of an image via an eyepiece 4. The stage 3 is configured to move in a horizontal direction (X-direction), a back-and-forth direction (Y-direction), and a vertical direction (Z-direction). More specifically, the stage 3 moves in the horizontal direction (X-direction) and the back-and-forth direction (Y-direction) by rotating a stage handle 6 mounted on a right side surface of the microscope main body 1, and moves in the vertical direction (Z-direction) by operating a focusing handle 7L mounted on a left side surface of the microscope main body 1 or a focusing handle 7R mounted on the right side surface of the microscope main body 1.

Figure 3:
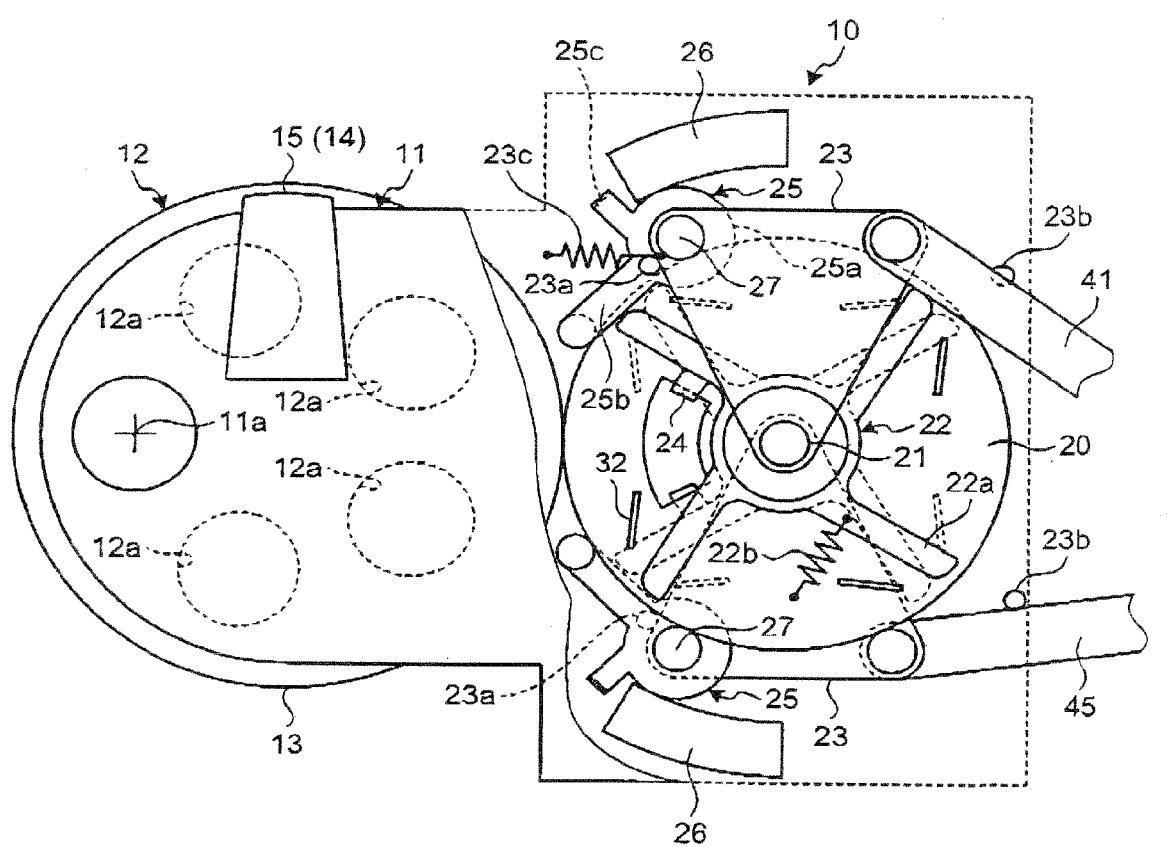
FIG. 3 is a plan view of a revolving nosepiece of the microscope according to the first embodiment.
Figure 4:
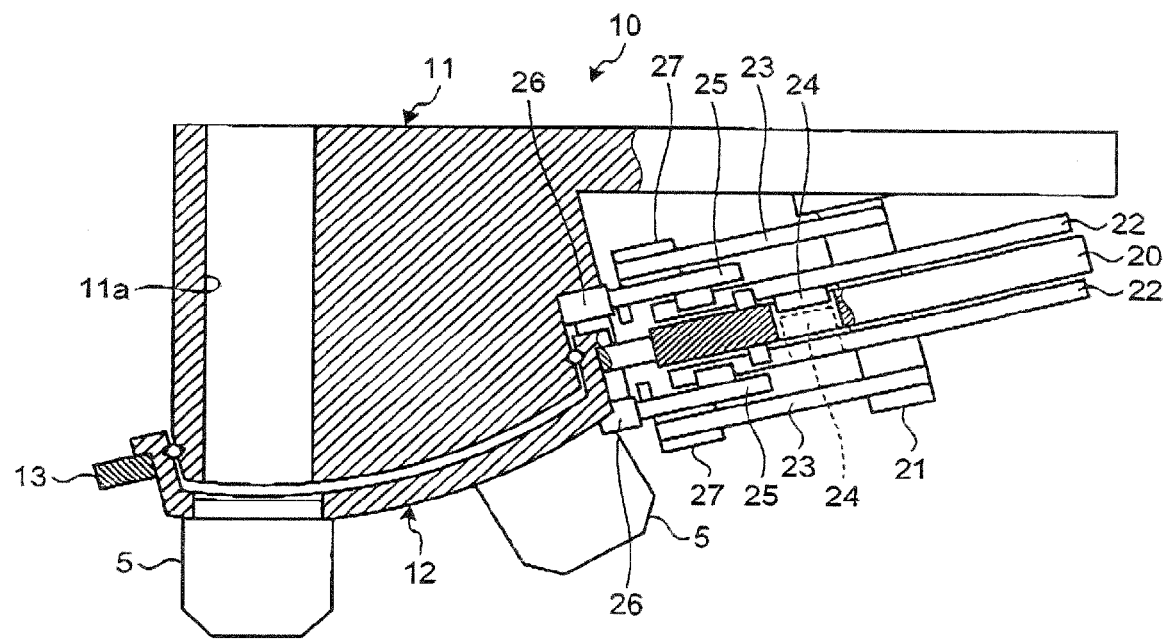
FIG. 4 is a sectional side view of the revolving nosepiece of the microscope according to the first embodiment.

The revolving nosepiece 10 of the microscope according to the first embodiment is described below with reference to FIGS. 3 and 4. FIG. 3 is a plan view of the revolving nosepiece 10 of the microscope according to the first embodiment. FIG. 4 is a sectional side view of the revolving nosepiece 10 of the microscope according to the first embodiment.

As shown in FIG. 4, the revolving nosepiece 10 of the microscope according to the first embodiment is configured to enable switching of objective lenses 5, and includes a revolving-nosepiece body (main body) 11 that is fixed to an underside of the end portion of the arm of the microscope main body 1 and the revolving-nosepiece rotating unit (movable member) 12 that is rotatably mounted on the revolving-nosepiece body 11.

An optical path 11a is formed in the revolving-nosepiece body 11 so that a light passing through the objective lenses 5 can be guided to the eyepiece 4 via the end portion of the arm of the microscope main body 1 and the lens barrel 2.

Plural objective lenses (optical elements) 5 can be mounted on the revolving-nosepiece rotating unit 12. Specifically, the revolving-nosepiece rotating unit 12 of the revolving nosepiece 10 of this embodiment is configured to have five objective lenses 5. More specifically, as shown in FIG. 3, screw holes 12a for mounting the objective lenses 5 are formed at positions on the same radius from the center of rotation of the revolving-nosepiece rotating unit 12 at regular intervals. Therefore, when the revolving-nosepiece rotating unit 12 is rotated one-fifth of a turn clockwise or counterclockwise in FIG. 3, the objective lenses 5 can be switched from one to the other.

As shown in FIG. 4, a driven gear 13 is formed on the circumference of the revolving-nosepiece rotating unit 12. The number of teeth on the driven gear 13 is set to a number divisible by the number of the objective lenses 5. In the first embodiment, the number of teeth on the driven gear 13 is set to a number divisible by five.

Figure 5:
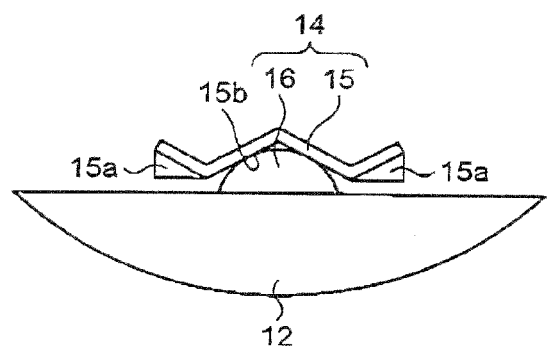
FIG. 5 is an enlarged side view of a click mechanism shown in FIG. 3.

As shown in FIG. 3, a click mechanism 14 is arranged between the revolving-nosepiece body 11 and the revolving-nosepiece rotating unit 12. The click mechanism 14 is configured to accurately stop the objective lenses 5 at stop positions. The click mechanism 14 of this embodiment includes, as shown in FIG. 5, the click 15 mounted on the revolving-nosepiece body 11 and the ball 16 mounted on the revolving-nosepiece rotating unit 12. The click 15 is a leaf spring mounted on a top surface of the revolving-nosepiece body 11 and structured such that the side edges 15a are obliquely bent so that the ball 16 can be put in from both sides and the groove 15b in which the ball 16 is to be fitted is arranged in the center of the click 15. The ball 16 is a hemispherical projection formed on a top edge surface of the revolving-nosepiece rotating unit 12 so as to correspond to the stop positions (switch positions) of the objective lenses 5. When the objective lenses 5 are switched from one to the other, the ball 16 that has been fitted in the groove 15b is released from the groove 1b, and then the ball 16 coming next is put in and fitted in the groove 15b.

As shown in FIG. 3, a driving gear 20 engaged with the driven gear 13 is mounted behind the revolving-nosepiece rotating unit 12. The driving gear 20 is configured to rotate the revolving-nosepiece rotating unit 12 and is attached to and rotatable around a rotation axis 21 arranged on the revolving-nosepiece body 11. A pitch diameter of the driving gear 20 is set to four-fifths of a pitch diameter of the driven gear 13, so that when the driving gear 20 is rotated one-quarter of a turn, the driven gear 13 is rotated one-fifth of a turn. Therefore, when the driving gear 20 is rotated one-quarter of a turn clockwise or counterclockwise in FIG. 3, the objective lenses 5 can be switched from one to the other.

As shown in FIG. 4, a cam 22 and a revolving-nosepiece switching lever 23 that rotate the driving gear 20 clockwise in FIG. 3 are mounted above the driving gear 20, and the cam 22 and the revolving-nosepiece switching lever 23 that rotate the driving gear 20 counterclockwise in FIG. 3 are mounted below the driving gear 20. The cam 22 that rotates the driving gear 20 clockwise and the cam 22 that rotates the driving gear 20 counterclockwise are mounted upside down to each other across the driving gear 20, and, as shown in FIG. 3, have the same shape. Similarly, the revolving-nosepiece switching lever 23 that rotates the driving gear 20 clockwise and the revolving-nosepiece switching lever 23 that rotates the driving gear 20 counterclockwise are mounted upside down to each other across the driving gear 20, and have the same shape.

Figure 6:
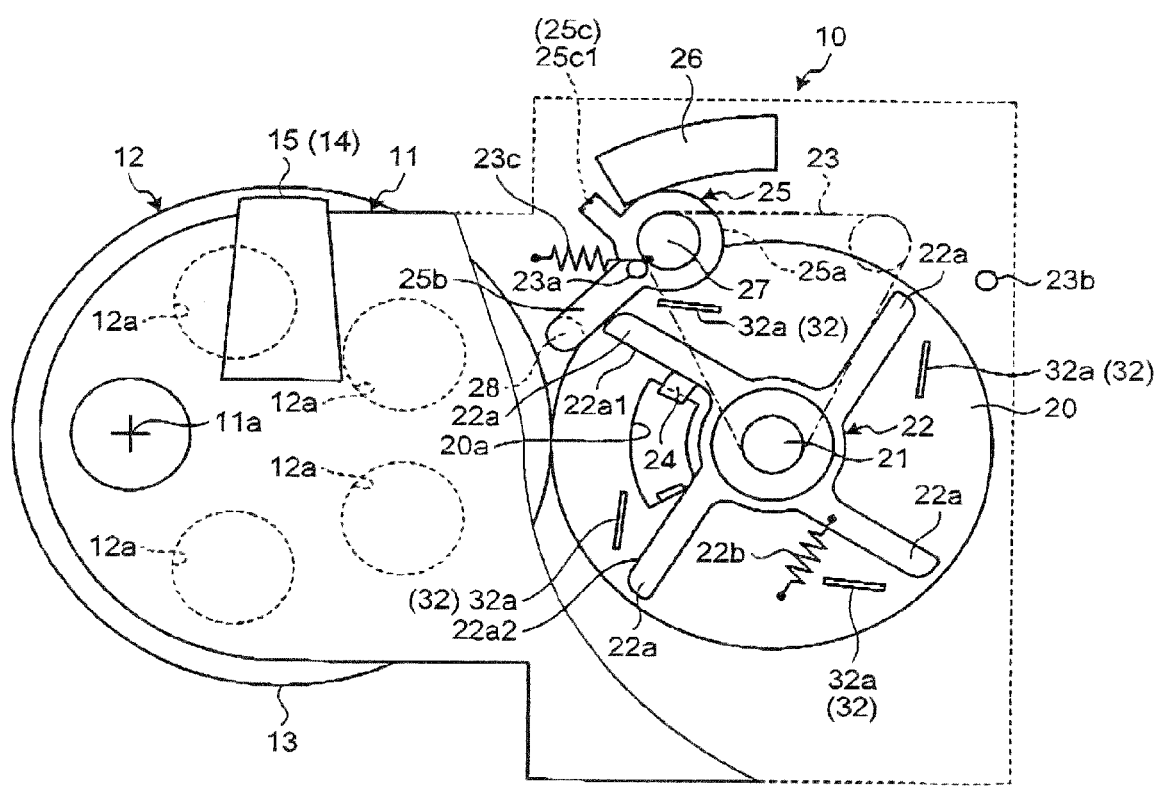
FIG. 6 is a plan view of the revolving nosepiece of the microscope according to the first embodiment, which includes a cam and a revolving-nosepiece switching lever mounted above a driving gear.

Therefore, only the cam 22 and the revolving-nosepiece switching lever 23 mounted above the driving gear 20 are described in detail below with reference to FIGS. 4 and 6 FIG. 6 is a plan view of the revolving nosepiece 10 of the microscope according to the first embodiment, which includes the cam 22 and the revolving-nosepiece switching lever 23 mounted above the driving gear 20. For convenience of explanation, the revolving-nosepiece switching lever 23 is illustrated by a chain double-dashed line in FIG. 6.

As shown in FIG. 4, the cam 22 is mounted just above the driving gear 20, and the revolving-nosepiece switching lever 23 is mounted above the cam 22. The cam 22 and the revolving-nosepiece switching lever 23 are attached to and rotatable around the rotation axis 21 that is the center of rotation of the driving gear 20.

As shown in FIG. 6, the cam 22 is configured to rotate the driving gear 20, and includes four arms 22a equally dividing 360 degrees (i.e., adjacent ones of the arms 22a have a phase difference of 90 degrees). Each of the arms 22a is extended in a radial direction from the center of rotation of the cam 22. One side surface of each of the arms 22a functions as a pressing surface (cam surface) 22a1 and the other side surface functions as an evacuating surface (cam surface) 22a2.

A cam convex portion 24 is arranged on one of the four arms 22a. The cam convex portion 24 is configured to connect the cam 22 and the driving gear 20, is inserted in a fan-shaped long groove 20a formed on the driving gear 20, and is biased in a rotation direction (clockwise in FIG. 6) by a spring 22b tensioned between the cam 22 (the arm 22a) and the driving gear 20. Therefore, when the cam 22 is rotated clockwise in FIG. 6, the cam 22 and the driving gear 20 rotate in an integrated manner. On the other hand, when the cam 22 is rotated counterclockwise against the biasing force of the spring 22b, the cam convex portion 24 idles in the long groove 20a, so that only the cam 22 rotates.

The revolving-nosepiece switching lever 23 has a substantially isosceles triangle shape, and a vertex portion thereof is attached to and rotatable around the rotation axis 21 that is the center of rotation of the driving gear 20. The rotation of the revolving-nosepiece switching lever 23 is regulated by a stopper 23a arranged on the left of the revolving-nosepiece switching lever 23 and a stopper 23b arranged on the right of the revolving-nosepiece switching lever 23. A link 25 is rotatably mounted on one corner area of a base side of the revolving-nosepiece switching lever 23 via a rotation axis 27. A spring 23c is tensioned between the revolving-nosepiece body 11 and the revolving-nosepiece switching lever 23 such that the revolving-nosepiece switching lever 23 is biased to rotate counterclockwise in FIG. 3. The link 25 includes a gear portion 25a, a link portion 25b, and a link convex portion 25c. The gear portion 25a is engaged with an internal gear 26 fixed to the revolving-nosepiece body 11 such that the link 25 rotates counterclockwise by rotating the revolving-nosepiece switching lever 23 clockwise in FIG. 6. In other words, when the revolving-nosepiece switching lever 23 is rotated clockwise, the link 25 revolves around the rotation axis 21 that is the center of rotation of the driving gear 20 while rotating around the rotation axis 27 that is the center of rotation of the link 25. A ratio between pitch diameters of the internal gear 26 and the gear portion 25a is set to 6 to 1. A rotation angle of the link 25 is five times larger than a rotation angle of the revolving-nosepiece switching lever 23 taking deduction of amount of revolution into consideration.

The link portion 25b is extended in a radial direction from the center of rotation of the link 25. A link pin 28 is mounted on an under surface of a distal end of the link portion 25b. The link pin 28 is configured to press the pressing surface 22a1 to rotate the cam 22 while moving along the pressing surface 22a1. When the revolving-nosepiece switching lever 23 is rotated clockwise in FIG. 6, the link 25 is rotated counterclockwise, so that the link pin 2B presses the pressing surface 22a1 while moving along the pressing surface 22a1.

A stopper mechanism is arranged between the link 25 and the driving gear 20. The stopper mechanism is configured to prevent shift of a stop position of the revolving-nosepiece rotating unit 12 caused by inertia, and includes the link convex portion 25c formed on the link 25 and a gear stopper 32 mounted on the top surface of the driving gear 20.

The link convex portion 25c is extended in a radial direction from the center of rotation of the link 25, and includes a stopper section 25c1 formed on an under surface of an end of the link convex portion 25c by bending and extended downward.

The gear stopper 32 includes a stopper section 32a extended upward. The stopper section 32a is structured such that it faces to the stopper section 25c1 across a small space when switching operation ends. The stopper section 32a is structured such that even in a situation where the stopper section 25c1 is brought into contact with the gear stopper 32, the stopper section 32a is then brought into face-to-face confronting relation with the stopper section 25c1 across a small space when the ball 16 falls in the groove 15b of the click mechanism 14 and fitted in the center of the groove 15b.

This configuration will be described in detail below with reference to FIGS. 7A to 7E and 8A to 8D. FIGS. 7A to 7E and 8A to 8D are schematic diagrams illustrating a relation between the link 25 and the cam 22.

Figure 7A:
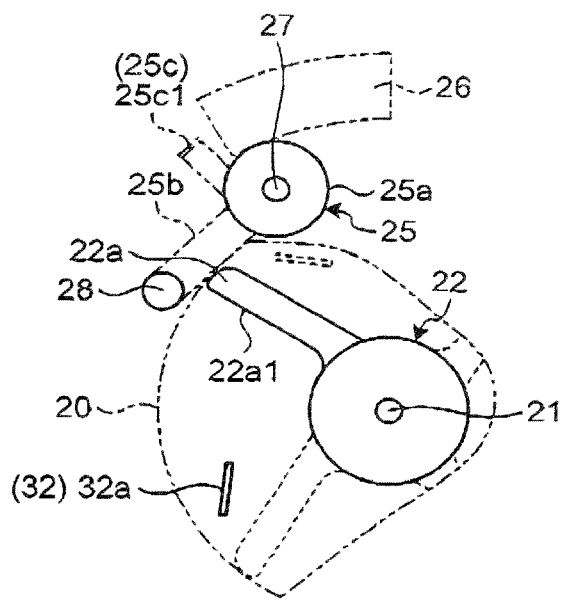
FIG. 7A is a schematic diagram illustrating a relation between a link and a cam in a standby state.

In a standby state before the switching operation of the revolving-nosepiece switching lever 23 is started, as shown in FIG. 6, a left edge of the revolving-nosepiece switching lever 23 is in contact with the stopper 23a. In the standby state, as shown in FIG. 7A, the link pin 28 and the pressing surface 22a1 are distant from each other, so that the link pin 28 does not act on the cam 22. Therefore, the cam 22 can freely rotate in such a manner that even when the revolving-nosepiece rotating unit 12 is rotated (manual operation) and thus the driving gear 20 and the can 22 are caused to rotate, rotation of the cam 22 is not transmitted to the link pin 28. Thus, in the revolving nosepiece 10 of this embodiment, the objective lenses 5 can be freely switched from one to the other by manually operating the revolving-nosepiece rotating unit 12.

Figure 7B:
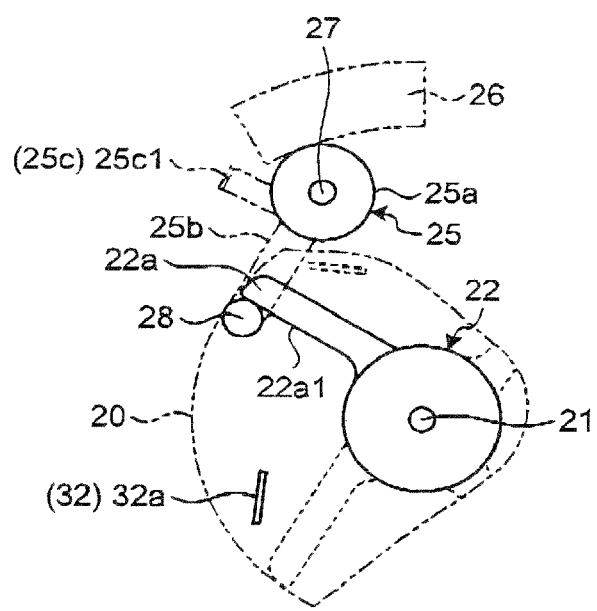
FIG. 7B is a schematic diagram illustrating a relation between the link and the cam when switching operation starts.

As shown in FIG. 7B, when the switching operation is started by slightly rotating the revolving-nosepiece switching lever 23 clockwise, the link 25 is rotated counterclockwise, so that the link pin 28 comes into contact with the pressing surface 22a1. Therefore, an operating force of the revolving-nosepiece switching lever 23 is transmitted to the cam 22, the driving gear 20, and the driven gear 13 (the revolving-nosepiece rotating unit 12) in this order, so that force for releasing the ball 16 from the groove 15b of the click 15 acts in the click mechanism 14. At this time, the link pin 28 presses the pressing surface 22a1 at a position distant from the center of rotation of the cam 22 in a radial direction within a movable range of the link pin 28, and a moving direction of the link pin 28 and a moving direction of the cam 22 cross at substantially right angles, resulting in generating large component of force due to wedge effect. Therefore, magnitude of the operating force can be reduced.

Figure 7C:
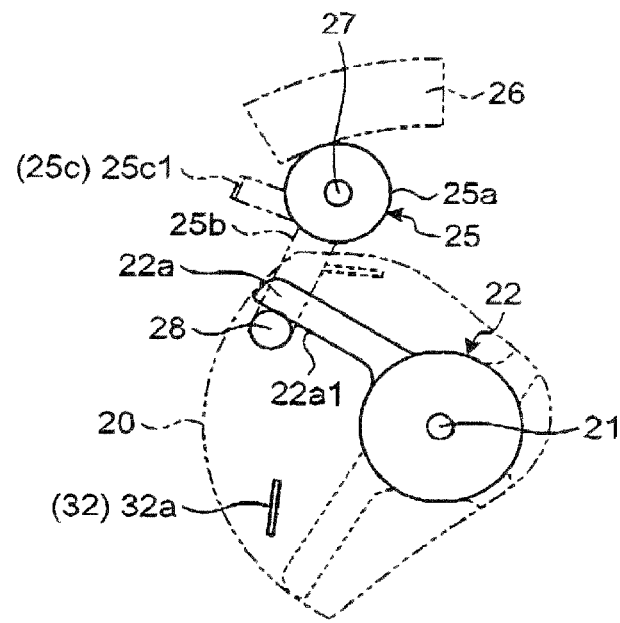
FIG. 7C is a schematic diagram illustrating a relation between the link and the cam just after the switching operation has started.

As shown in FIG. 7C, when the revolving-nosepiece switching lever 23 is further rotated clockwise, force for releasing the ball 16 from the click 15 acts in the click mechanism 14. At this time, as shown in FIG. 7C, the contact point (point of support) between the link pin 28 and the pressing surface 22a1 comes slightly closer to the center of rotation (fulcrum) of the cam 22. However, because the ball 16 is already released from the groove 15b of the click 15, large torque (magnitude of force) is not needed. Therefore, the revolving-nosepiece switching lever 23 can be rotated with relatively small torque (magnitude of force).

Figure 7D:
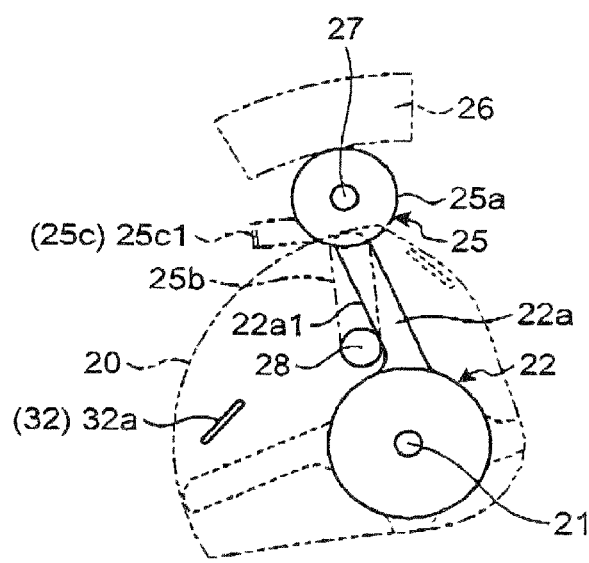
FIG. 7D is a schematic diagram illustrating a relation between the link and the cam during the switching operation.

As shown in FIG. 7D, when the revolving-nosepiece switching lever 23 is further rotated clockwise, the contact point (point of support) between the link pin 28 and the pressing surface 22a1 comes closest to the center of rotation (fulcrum) of the cam 22. Therefore, while the amount of rotation of the cam 22 becomes larger than the amount of operation of the revolving-nosepiece switching lever 23, because the ball 16 is already released from the click 15, the revolving-nosepiece switching lever 23 can be rotated with a small operating force (magnitude of force).

Figure 7E:
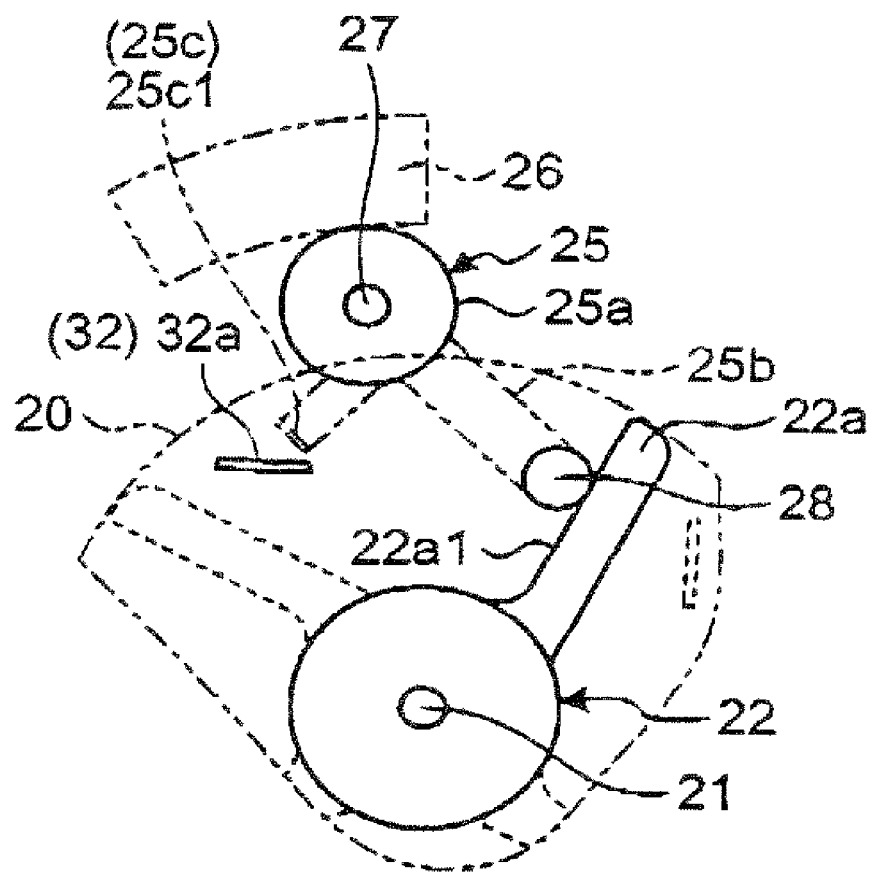
FIG. 7E is a schematic diagram illustrating a relation between the link and the cam when the switching operation ends.

As shown in FIG. 7E, when the revolving-nosepiece switching lever 23 is further rotated clockwise, force for putting the ball 16 in the click 15 acts in the click mechanism 14. At this time, the contact point (point of support) between the link pin 28 and the pressing surface 22a1 is located farthest from the center of rotation (fulcrum) of the cam 22 in a radial direction within the movable range of the link pin 28. Therefore, the revolving-nosepiece switching lever 23 can be rotated with relatively small torque (magnitude of force).

When the revolving-nosepiece switching lever 23 is rotated clockwise until it comes into contact with the stopper 23b, the objective lenses 5 are switched. From one to the other and the stopper section 32a and the stopper section 25c1 face to each other across a small space. Meanwhile, when the revolving-nosepiece rotating unit 12 is overly rotated (overrun) because of inertia of the revolving-nosepiece rotating unit 12, the stopper section 32a and the stopper section 25c1 come into contact with each other, resulting in stopping the rotation of the revolving-nosepiece rotating unit 12. At this time, because the ball 16 is located within the groove 15b in the click mechanism 14, elastic restoring force of the click 15 acts on the ball 16 such that the revolving-nosepiece rotating unit 12 is slightly rotated (reverse rotation) to fit the ball 16 in the center of the groove 15b. Accordingly, the ball 16 is fitted in the center of the groove 15b and the revolving-nosepiece rotating unit 12 is stopped at a regular position (switching end position).

Figure 8A:
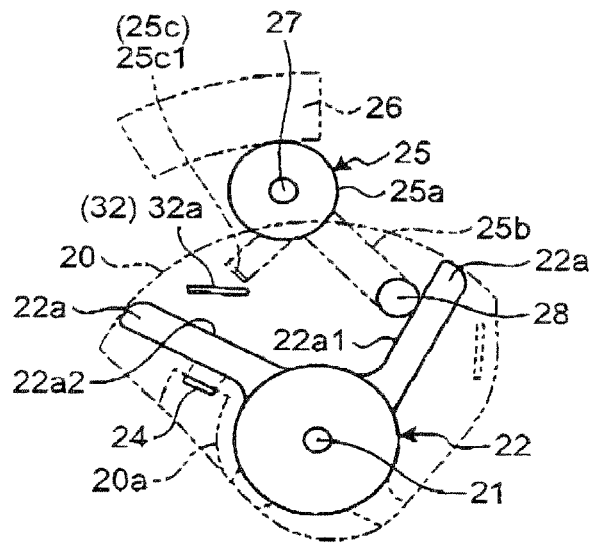
FIG. 8A is a schematic diagram illustrating a relation between the link and the cam when a return operation starts.
Figure 8B:
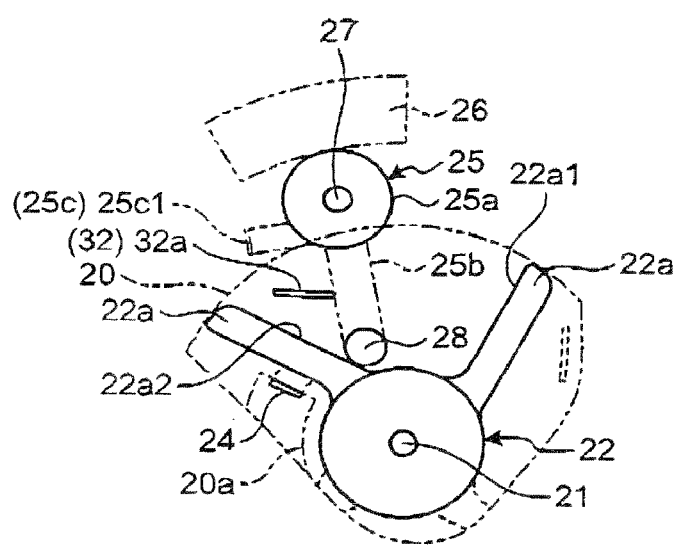
FIG. 8B is a schematic diagram illustrating a relation between the link and the cam during the return operation.
Figure 8C:
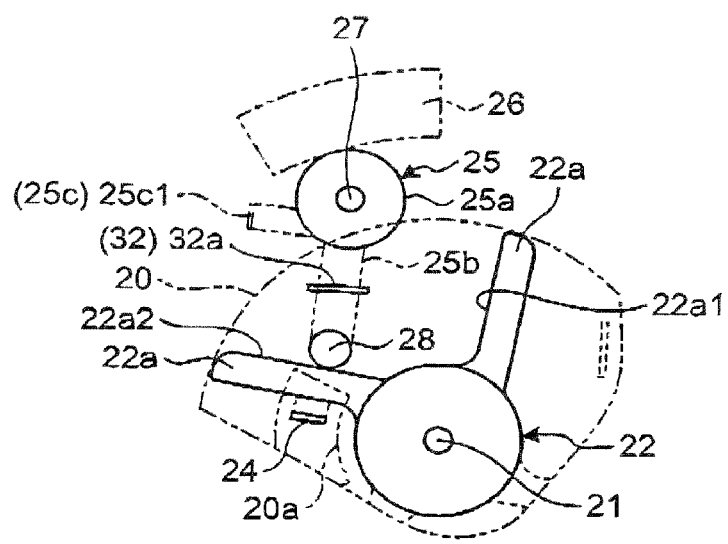
FIG. 8C is a schematic diagram illustrating a relation between the link and the cam just before the return operation ends.

As shown in FIG. 8A, in a state before return operation of the revolving-nosepiece switching lever 23 is started, the stopper section 32a and the stopper section 25c1 face to each other across the small space. When the return operation is started, biasing force of the spring 23c acts to rotate the revolving-nosepiece switching lever 23 counterclockwise. Consequently, as shown in FIG. 8B, the link 25 starts rotating clockwise, so that the link pin 28 comes away from the pressing surface 22a1 and then comes into contact with the evacuating surface 22a2.

Then, as shown in FIG. 5C, the link pin 28 presses the evacuating surface 22a2, so that the cam 22 is rotated counterclockwise and the cam convex portion 24 accordingly idles in the long groove 20a. In other words, the cam convex portion 24 comes away from the right edge of the long groove 20a.

Figure 8D:
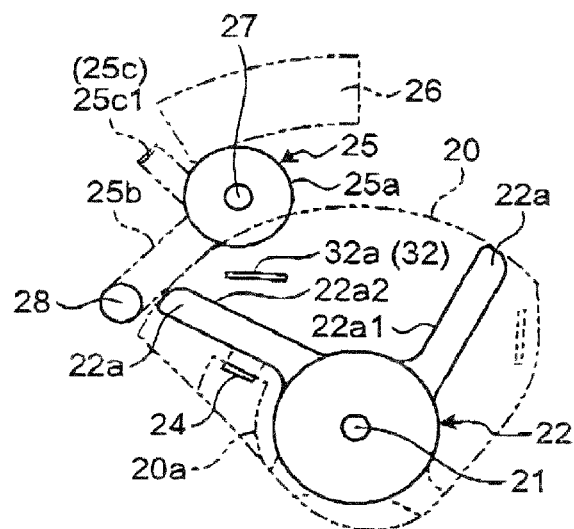
FIG. 8D is a schematic diagram illustrating a relation between the link and the cam after the return operation has ended.

When the revolving-nosepiece switching lever 23 is rotated counterclockwise until it comes into contact with the stopper 23a, as shown in FIG. 8D, the link pin 28 is released from the evacuating surface 22a2, so that the link pin 28 does not act on the cam 22. Subsequently, elastic restoring force of the spring 22b acts on the cam 22, so that the cam convex portion 24 comes into contact with the right edge of the long groove 20a (standby state).

In this manner, when the switching operation of the revolving-nosepiece switching lever 23 is performed, the cam 22 rotates one-quarter of a turn.

As shown in FIG. 2, a link 41 is rotatably connected to the other corner area of the base side of the revolving-nosepiece switching lever 23 mounted above the driving gear 20. The revolving-nosepiece switching lever 23 forms a four-bar cross linkage with the link 41 and a link 42 rotatably connected to the link 41 via one end thereof. An end of a rotation axis 43 is fixed to the other end of the link 42, and an end of an operation lever 44 is fixed to the other end of the rotation axis 43. Therefore, the operation lever 44 and the link 42 are allowed to rotate around the rotation axis 43. The operation lever 44 is extended to near the rear of the focusing handle 7L mounted on the left side surface of the microscope main body 1, and an operation knob (first optical-element switching operating unit) 8La is mounted on an end of the operation lever 44.

A link 45 is rotatably connected to one corner area of a base side of the revolving-nosepiece switching lever 23 mounted below the driving gear 20. The revolving-nosepiece switching lever 23 forms a four-bar parallel linkage with the link 45 and a link 46 rotatably connected to the link 45 via one end thereof. An end of a rotation axis 47 is fixed to the other end of the link 46, and an end of an operation lever 48 is fixed to the other end of the rotation axis 47. Therefore, the operation lever 48 and the link 46 are allowed to rotate around the rotation axis 47. The operation lever 48 is extended to near the rear of the focusing handle 7L mounted on the left side surface of the microscope main body 1, and an operation knob (second optical-element switching operating unit) 8Lb is mounted on an end of the operation lever 48.

The operation knob 8La and the operation knob 8Lb are arrayed in the vertical direction and configured to enable operation of the revolving nosepiece 10 without disturbing operational posture for the focusing handle 7L such that they can be manually operated even with a third finger or a fourth finger (little finger). The operation knob 8La and the operation knob 8Lb are operated by pulling either one of them forward by a predetermined amount, for example, by an arbitrarily-set operation amount in a preferable range from 30 millimeters to 70 millimeters. When the operation knob 8La on the front side is pulled, the revolving-nosepiece rotating unit 12 is rotated counterclockwise in FIG. 2, and when the operation knob 8Lb on the rear side is pulled, the revolving-nosepiece rotating unit 12 is rotated clockwise in FIG. 2.

A fan-shaped sector gear 50 is fixed to the rotation axis 43 described above A sector gear 51 having the same shape as the sector gear 50 is engaged with the sector gear 50 such that the sector gear 51 rotates clockwise by rotating the sector gear 50 counterclockwise. The sector gear 51 is fixed to a rotation axis 52 that is rotatably supported, and an end of an operation lever 53 is fixed to the rotation axis 52, so that the operation lever 53 and the sector gear 51 are allowed to rotate around the rotation axis 52. The operation lever 53 is extended to near the rear of the focusing handle 7R mounted on the right side surface of the microscope main body 1, and an operation knob (the first optical-element switching operating unit) 8Ra is mounted on an end of the operation lever 53. The operation lever 53 is interlocked with the operation lever 44 such that when the operation knob 8Ra is pulled forward, the operation knob 8La moves forward, and, when the operation knob 8La is pulled forward, the operation knob 8Ra moves forward.

A fan-shaped sector gear 54 is fixed to the rotation axis 47 described above A sector gear 55 having the same shape as the sector gear 54 is engaged with the sector gear 54 such that the sector gear 55 rotates clockwise by rotating the sector gear 54 counterclockwise. The sector gear 55 is fixed to a rotation axis 56 that is rotatably supported, and an end of an operation lever 57 is fixed to the rotation axis 56, so that the operation lever 57 and the sector gear 55 are allowed to rotate around the rotation axis 52. The operation lever 57 is extended to near the rear of the focusing handle 7R mounted on the right side surface of the microscope main body 1, and an operation knob (the second optical-element switching operating unit) 8Rb is mounted on an end of the operation lever 57. The operation lever 57 is interlocked with the operation lever 48 such that when the operation knob 8Rb is pulled forward, the operation knob 8Lb moves forward, and, when the operation knob 8Lb is pulled forward, the operation knob 8Rb moves forward.

The operation knob 8Ra and the operation knob 8Rb are arrayed in the vertical direction and configured to enable operation of the revolving nosepiece 10 without disturbing operational posture for the focusing handle 7R such that they can be manually operated even with a third finger or a fourth finger. The operation knob 8Ra and the operation knob 8Rb are operated by pulling either one of them forward by a predetermined amount, for example, by an arbitrarily-set operation amount in a preferable range from 30 millimeters to 70 millimeters. When the operation knob 8Ra on the front side is pulled, the revolving-nosepiece rotating unit 12 is rotated counterclockwise in FIG. 2, and when the operation knob 8Rb on the rear side is pulled, the revolving-nosepiece rotating unit 12 is rotated clockwise in FIG. 2.

In this manner, the revolving nosepiece 10 of the microscope according to the first embodiment is configured such that the sector gear 50 fixed to the rotation axis 43 is engaged with the sector gear 51 fixed to the rotation axis 52, so that the revolving-nosepiece rotating unit 12 can be rotated counterclockwise in FIG. 2 by operating either one of the operation knob 8La and the operation knob 8Ra. Similarly, the sector gear 54 fixed to the rotation axis 47 is engaged with the sector gear 55 fixed to the rotation axis 56, so that the revolving-nosepiece rotating unit 12 can be rotated clockwise in FIG. 2 by operating either one of the operation knob 8Lb and the operation knob 8Rb. Thus, an operator of the microscope can selectively operate the operation knob on a preferable side.

More specifically, operation can be performed by pulling either one of the operation knob 8La (8Ra) and the operation knob 8Lb (8Rb) forward. An operating force of the operation knob 8La (8Ra) is transmitted to the revolving-nosepiece switching lever 23 via the link 42 and the link 41, and then further transmitted to the cam 22 via the link 25 and the link pin 28. On the other hand, an operating force of the operation knob 8Lb (8Rb) is transmitted to the revolving-nosepiece switching lever 23 via the link 46 and the link 45, and then further transmitted to the cam 22 via the link 25 and the link pin 28.

Just after the operation of the operating knobs 8La (8Ra) and 8Lb (8Rb) has started, the link pin 28 presses the pressing surface 22a1 at a position distant from the center of rotation of the cam 22, and the moving direction of the link pin 28 and the moving direction of the cam 22 cross at substantially right angles, resulting in generating large component of force due to wedge effect. As a result, the ball 16 can be released from the groove 15b of the click 15 with a small operating force (magnitude of force).

Similarly to a case just after the operation knobs 8La and 8Lb has started, just before the operation of the operating knobs 8La (8Ra) and 8Lb (8Rb) ends, the link pin 28 presses the pressing surface 22a1 at a position distant from the center of rotation of the cam 22, and the moving direction of the link pin 28 and the moving direction of the cam 22 cross at substantially right angles, resulting in generating large component of force due to wedge effect. As a result, the ball 16 can be put in the groove 15b of the click 15 with a small operating force (magnitude of force).

In the revolving nosepiece 10 of the microscope according to the first embodiment as described above, the objective lenses 5 can be switched from one to the other by manually operating the revolving-nosepiece rotating unit 12 or manually operating the operation knob 8a (8Ra) or the operation knob 8Lb (8Rb).

Furthermore, when the ball 16 is released from the groove 15b of the click 15 just after the switching operation of the objective lenses 5 has started, the contact point (point of support) between the link pin 28 and the pressing surface 22a1 is located distant from the center of rotation (fulcrum) of the cam 22. Therefore, an operating force (magnitude of force) of the revolving-nosepiece switching lever 23 can be reduced.

Similarly, when the ball 16 is put in the groove 15b of the click 15 just before the switching operation of the objective lenses 5 ends, the contact point (point of support) between the link pin 28 and the pressing surface 22a1 is located distant from the center of rotation (fulcrum) of the cam 22. Therefore, an operating force (magnitude of force) of the revolving-nosepiece switching lever 23 can be reduced.

Second Embodiment

A second embodiment of the present invention will be described below with reference to FIG. 9 using, similarly to the first embodiment described above, an example in which an optical-element switching device of a microscope is applied to a revolving nosepiece of a microscope FIG. 9 is a plan view of a revolving nosepiece 110 of a microscope according to the second embodiment.

As shown in FIG. 9, the revolving nosepiece 110 of the microscope according to the second embodiment is configured, similarly to the revolving nosepiece 10 described above, to switch objective lenses (optical elements) from one to the other. Specifically, the objective lenses are moved in the horizontal direction when being switched from one to the other (translatory type). The same components as those of the revolving nosepiece 10 of the microscope according to the first embodiment described above are denoted with the same reference symbols, and therefore, the same explanation is not repeated.

The revolving nosepiece 110 includes a revolving-nosepiece body (main body) 111 that is fixed to an underside of the end portion of the arm of the microscope main body 1 and a revolving-nosepiece moving unit (movable member) 112 that is movably mounted on the revolving-nosepiece body 111. A pair of guides 111b is mounted on the revolving-nosepiece body 111. The guides 111b as a pair are bar-shaped members having circular cross sections and mounted parallel to each other. The guides 111b are inserted into guide holes (not shown) formed on the revolving-nosepiece moving unit 112 so that the revolving-nosepiece moving unit 112 can move in the horizontal direction.

An optical path 111a is formed in the revolving-nosepiece body 111 so that a light passing through objective lenses can be guided to the eyepiece via an end portion of the arm of the microscope main body 1 and the lens barrel.

Plural objective lenses can be mounted on the revolving-nosepiece moving unit 112. Specifically, the revolving-nosepiece moving unit 112 in the revolving nosepiece 110 of the microscope according to the second embodiment is configured to have five objective lenses. More specifically, screw holes 112a for mounting the objective lenses are formed on the same line in the moving direction of the revolving-nosepiece moving unit 112 at regular intervals. Therefore, when the revolving-nosepiece moving unit 112 is moved to the left or to the right in FIG. 9, the objective lenses can be switched from one to the other. A rack gear 113 is mounted on a back edge portion of the revolving-nosepiece moving unit 112. An operation lever 112b is mounted on a right side surface of the revolving-nosepiece moving unit 112 such that the revolving-nosepiece moving unit 112 can be moved and thus the objective lenses can be switched from one to the other by direct manual operation of the operation lever 112b.

A click mechanism 114 is arranged between the revolving-nosepiece body 111 and the revolving-nosepiece moving unit 112. The click mechanism 114 is configured to accurately stop the objective lenses at stop positions. The click mechanism 114 of this embodiment includes a click 115 mounted on the revolving-nosepiece body 111 and a ball (not shown) mounted on the revolving-nosepiece moving unit 112. The click 115 is a leaf spring mounted on the revolving-nosepiece body 111 and is structured such that side edges thereof are obliquely bent so that the ball can be put in from both sides and a groove (not shown) in which the ball is to be fitted is arranged in the center of the click 115. The ball is a hemispherical projection formed on a top surface of the revolving-nosepiece moving unit 112 so as to correspond to the stop positions (switch positions) of the objective lenses. When the objective lenses are switched from one to the other, the ball that has been fitted in the groove is released from the groove, and then the ball coming next is put in and fitted in the groove.

The driving gear 20 is mounted behind the revolving-nosepiece roving unit 112. A reduction gear 161 that includes an operation gear portion (large-diameter gear portion) 161a engaged with the driving gear 20 and a driven gear portion (small-diameter gear portion) 161b engaged with the rack gear 113 is mounted between the driving gear 20 and the rack gear 113. A pitch diameter of the operation gear portion 161a is set to be one fourth of a pitch diameter of the driving gear 20. A length of a pitch circle (a developed length) of the driven gear portion 161b is set to be equal to an interval (a pitch) between the screw holes 112a. Therefore, when the driving gear 20 is rotated one-quarter of a turn, the reduction gear 161 is rotated one turn, so that the objective lenses mounted on the adjacent screw holes 112a are switched from one to the other.

The revolving nosepiece 110 of the microscope according to the second embodiment described above is configured to enable switching of the objective lenses from one to the other by operation of an operation knob mounted near a focusing handle. Therefore, an operator of the microscope need not change operation posture for the focusing handle.

Furthermore, the revolving nosepiece 110 of the microscope according to the second embodiment can reduce, similarly to the revolving nosepiece 10 of the microscope according to the first embodiment described above, magnitude of operating force used when the ball is released from the click 115 or when the ball is fitted in the click 115. Moreover, amount of operation of the operation knob can be reduced during the switching operation.

Third Embodiment

Figure 10:
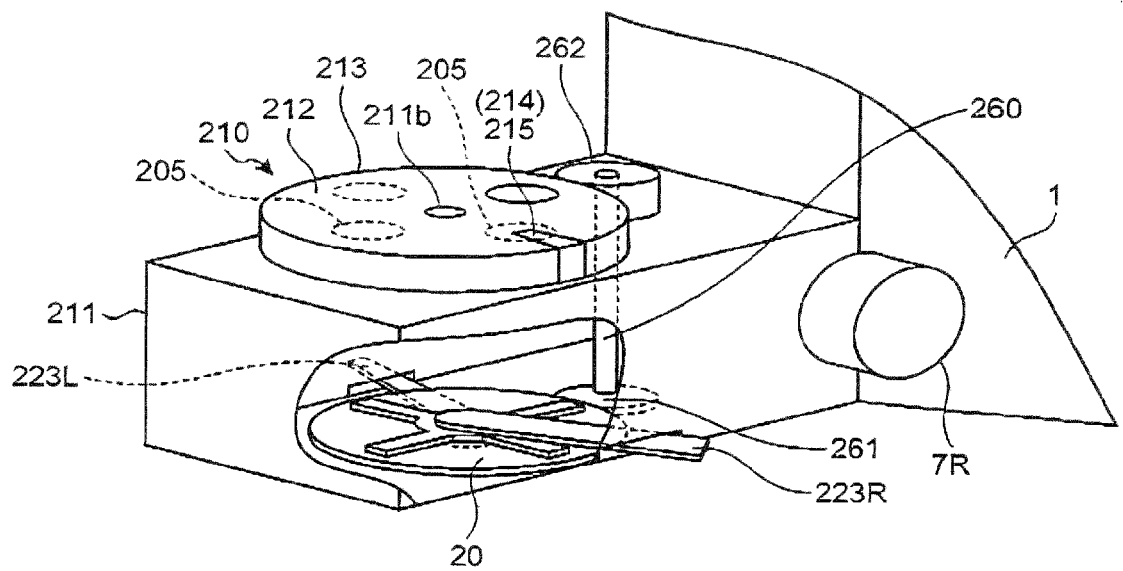
FIG. 10 is a perspective view of a condenser of a microscope according to a third embodiment of the present invention.
Figure 11:
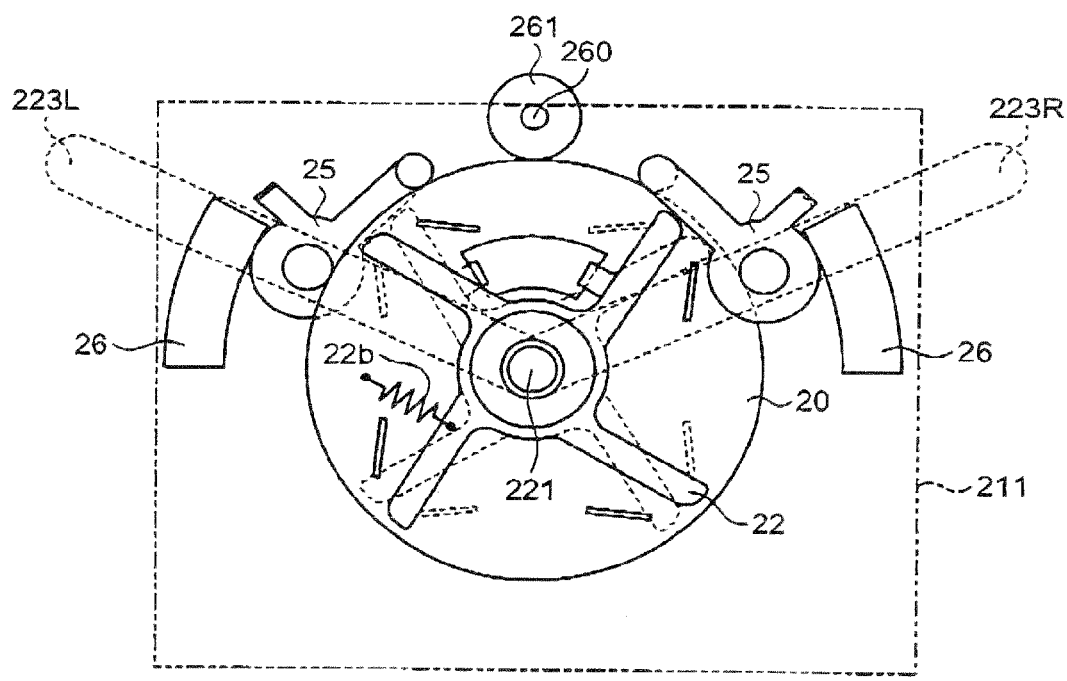
FIG. 11 is a plan view of the condenser shown in FIG. 10.

A third embodiment of the present invention will be described below with reference to FIGS. 10 and 11 using an example in which an optical-element switching device of a microscope is applied to a condenser of a microscope FIG. 10 is a perspective view of a condenser 210 of a microscope according to the third embodiment FIG. 11 is a plan view of the condenser 210 shown in FIG. 10. The same components as those of the revolving nosepiece 10 of the microscope according to the first embodiment described above are denoted with the same reference symbols, and therefore, the same explanation is not repeated.

As shown in FIG. 10, the condenser 210 of the microscope according to the third embodiment is configured to enable switching of optical elements 205, and includes a condenser body (casing) 211 that moves up and down along with a stage, and a turret 212 that is rotatably mounted on the condenser body 211.

The turret 212 is rotatably mounted on the condenser body 211 via a rotation axis 211b. Plural optical elements 205 can be mounted on the turret 212. Specifically, the turret 212 of the condenser 210 of this embodiment is configured to have four optical elements 205. More specifically, the optical elements 205 are mounted at positions on the same radius from the center of rotation of the turret 212 at regular intervals. Therefore, when the turret 212 is rotated one-quarter of a turn clockwise or counterclockwise in FIG. 10, the optical elements 205 can be switched from one to the other.

A driven gear 213 is mounted on the circumference of the turret 212. The number of teeth on the driven gear 213 is set to a number divisible by the number of the optical elements 205. In the third embodiment, the number of teeth on the driven gear 213 is set to a number divisible by four.

A click mechanism 214 is arranged between the condenser body 211 and the turret 212. The click mechanism 214 is configured to accurately stop the optical elements 205 at stop positions. The click mechanism 214 of this embodiment includes a click 215 mounted on the condenser body 211 and a ball (not shown) mounted on the turret 212. The click 215 is a leaf spring mounted on a top surface of the condenser body 211 and structured such that side edges thereof are obliquely bent so that the ball can be put in from both sides and a groove in which the ball is to be fitted in is arranged in the center of the click 215. The ball is a hemispherical projection formed on a top surface of the turret 212 so as to correspond to the stop positions (switch positions) of the optical elements 205. When the optical elements 205 are switched from one to the other, the tall that has been fitted in the groove is released from the groove, and then the ball coming next is put in and fitted in the groove.

The driving gear 20 is mounted inside the condenser body (casing) 211. The driving gear 20 is configured to rotate the turret 212 and is attached to and rotatable around a rotation axis 221 arranged on the condenser body 211. An idler 260 is arranged between the driving gear 20 and the driven gear 213 (the turret 212) such that the turret 212 (the driven gear 213) is rotated along with rotation of the driving gear 20. The idler 260 is a rotation axis rotatably supported by the condenser body 211. An idler gear 261 engaged with the driving gear 20 is mounted on one end of the idler 260 and an idler gear 262 engaged with the driven gear 213 (the turret 212) is mounted on the other end of the idler 260. A gear ratio between the driving gear 20 and the idler gear 261 engaged with the driving gear 20 is set to be equal to a gear ratio between the driven gear 213 and the idler gear 262 engaged with the driven gear 213, so that when the driving gear 20 is rotated one turn, the driven gear 213 (the turret 212) is rotated one turn. Therefore, the optical elements 205 can be switched from one to the other by rotating the driving gear 20 one-quarter of a turn clockwise or counterclockwise in FIG. 10.

As shown in FIG. 11, the cam 22 and a switching lever (optical-element switching operating unit) 223R that rotate the driving gear 20 clockwise in FIG. 11 are mounted above the driving gear 20, and the cam 22 and a switching lever (optical-element switching operating unit) 223L that rotate the driving gear 20 counterclockwise in FIG. 11 are mounted below the driving gear 20. The cam 22 that rotates the driving gear 20 clockwise and the cam 22 that rotates the driving gear 20 counterclockwise are mounted upside down to each other across the driving gear 20, and have the same shape. Similarly, the switching lever 223R that rotates the driving gear 20 clockwise and the switching lever 223L that rotates the driving gear 20 counterclockwise are mounted upside down to each other across the driving gear 20, and have the same shape. For convenience of explanation, the switching lever 223R and the switching lever 223L are illustrated by dashed lines in FIG. 11.

As shown in FIG. 10, the switching lever 223R mounted above the driving gear 20 is a plate-like member extended from the center of rotation of the driving gear 20 to near the focusing handle 7R mounted on the right side surface of the microscope main body 1. An end of the switching lever 223R is attached to and rotatable around the rotation axis 221 that is the center of rotation of the driving gear 20.

When, as shown in FIG. 11, the switching lever 223R is rotated clockwise in FIG. 11, an operating force is transmitted to the link 25 and the cam 22 in this order, so that the driving gear 20 is rotated one-quarter of a turn clockwise. When the driving gear 20 rotates one-quarter of a turn clockwise, its rotation is transmitted to the driven gear 213 via the idler 260, so that the turret 212 is rotated one-quarter of a turn clockwise. As a result, the optical elements 205 can be switched from one to the other.

On the other hand, the switching lever 223L mounted below the driving gear 20 is a plate-like member extended from the center of rotation of the driving gear 20 to near the focusing handle 7L mounted on the left side surface of the microscope main body 1. As shown in FIG. 11, an end of the switching lever 223L is attached to and rotatable around the rotation axis 221 that is the center of rotation of the driving gear 20.

When the switching lever 223L is rotated counterclockwise in FIG. 11, an operating force is transmitted to the link 25 and the cam 22 in this order, so that the driving gear 20 is rotated one-quarter of a turn counterclockwise. When the driving gear 20 rotates one-quarter of a turn counterclockwise, its rotation is transmitted to the driven gear 213 via the idler 260, so that the turret 212 is rotated one-quarter of a turn counterclockwise. As a result, the optical elements 205 can be switched from one to the other.

The condenser 210 of the microscope according to the third embodiment described above is configured to enable switching of the optical elements 205 from current one to adjacent one by operation of the switching lever 223L mounted on the left side surface of the microscope main body and the switching lever 223R mounted on the right side surface of the microscope main body. Therefore, an operator of the microscope need not change operation posture.

Furthermore, the condenser 210 of the microscope according to the third embodiment can reduce, similarly to the revolving nosepiece 10 of the microscope according to the first embodiment described above, magnitude of operating force used when the ball is released from the click or when the ball is fitted in the click. Moreover, amount of operation of the switching lever can be reduced during the switching operation.

Fourth Embodiment

Figure 12:
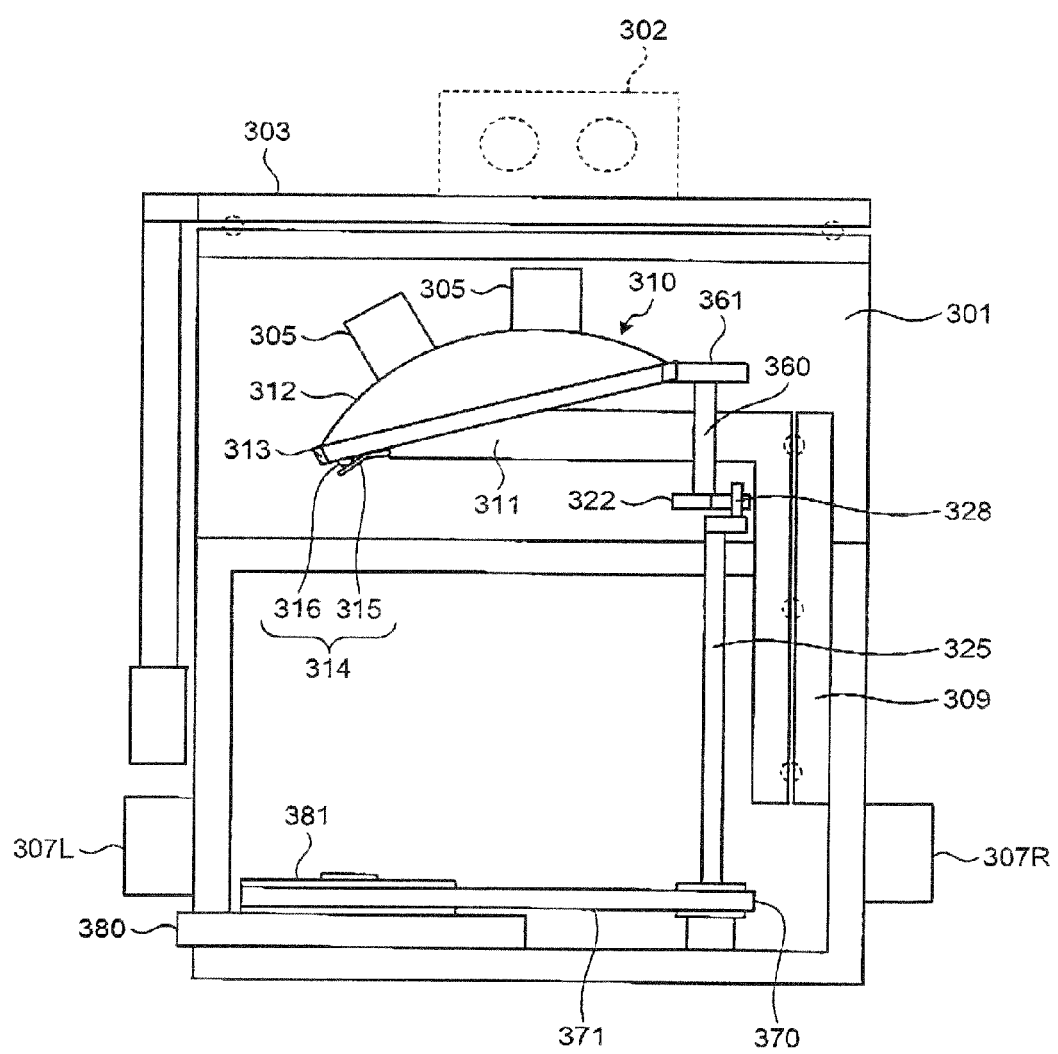
FIG. 12 is a schematic diagram of an inverted microscope according to the third embodiment.

A fourth embodiment of the present invention will be described below with reference to FIG. 12 using an example in which an optical-element switching device of a microscope is applied to a revolving nosepiece of an inverted microscope. FIG. 12 is a schematic diagram of an inverted microscope according to the fourth embodiment.

As shown in FIG. 12, the microscope according to the fourth embodiment includes a microscope main body 301, a lens barrel 302, and a stage 303. The lens barrel 302 is mounted on the microscope main body 301 to enable observation of an image via an eyepiece (not shown). The stage 303 is configured to move in a horizontal direction (X-direction) and in a back-and-forth direction (Y-direction) such that mounted specimen can be moved to a two-dimensional arbitrary position.

A revolving nosepiece 310 of the microscope according to the fourth embodiment is movably guided in the vertical direction by a focusing guide 309. Specifically, the revolving nosepiece 310 moves in the vertical direction (Z-direction) by operating the focusing handles 307R and 307L respectively mounted on the right side surface and the left side surface of the microscope main body 301.

As shown in FIG. 12, the revolving nosepiece 310 of the microscope according to the fourth embodiment is configured to enable switching of objective lenses (optical elements) 305, and includes a revolving-nosepiece body (main body) 311 that is extended in the horizontal direction from a top end of the focusing guide 309 and a revolving-nosepiece rotating unit (movable member) 312 that is rotatably mounted on the revolving-nosepiece body 31'.

Plural objective lenses 305 can be mounted on the revolving-nosepiece rotating unit 312. Specifically, the revolving-nosepiece rotating unit 312 of the revolving nosepiece 310 of this embodiment is configured to have four objective lenses 305. More specifically, screw holes (not shown) for mounting the objective lenses 305 are formed at positions on the same radius from the center of rotation of the revolving-nosepiece rotating unit 312 at regular intervals. Therefore, when the revolving-nosepiece rotating unit 312 is rotated one-quarter of a turn clockwise or counterclockwise, the objective lenses 305 can be switched from one to the other.

A driven gear 313 is mounted on the circumference of the revolving-nosepiece rotating unit 312. The number of teeth on the driven gear 313 is set to a number divisible by the number of the objective lenses 305. In the fourth embodiment, the number of teeth on the driven gear 313 is set to a number divisible by four.

A click mechanism 314 is arranged between the revolving-nosepiece body 311 and the revolving-nosepiece rotating unit 312. The click mechanism 314 is configured to accurately stop the objective lenses 305 at stop positions. The click mechanism 314 of this embodiment includes a click 315 mounted on the revolving-nosepiece body 311 and a ball 316 mounted on an underside of the revolving-nosepiece rotating unit 312. The click 315 is a leaf spring mounted on an under surface of the revolving-nosepiece body 311 and structured such that the side edges thereof are obliquely bent so that the ball 316 can be put in from both sides and a groove in which the ball 316 is to be fitted is arranged in the center of the click 315. The ball 316 is a hemispherical projection formed on an under surface of an end of the revolving-nosepiece rotating unit 312 so as to correspond to the stop positions (switch positions) of the objective lenses 305. When the objective lenses 305 are switched from one to the other, the ball 316 that has been fitted in the groove is released from the groove, and then the ball 316 coming next is put in and fitted in the groove.

A bevel gear 361 engaged with the driven gear 313 is mounted on the right of the revolving-nosepiece rotating unit 312 such that when the bevel gear 361 is rotated one turn, the driven gear 313 is rotated one-quarter of a turn, so that the objective lenses 305 are switched from a current one to an adjacent one. The bevel gear 361 is mounted on a top end of a drive axis 360 that is rotatably supported by a base end of the revolving-nosepiece body 311. The bevel gear 361 is configured to move in the vertical direction along with the revolving-nosepiece body 311 and the revolving-nosepiece rotating unit 312. A rotation axis of the revolving-nosepiece rotating unit 312 is inclined with respect to the focusing guide 309. The driven gear 313 and the bevel gear 361 are engaged with each other, and an extension direction of the drive axis 360 coincides with the guide direction of the focusing guide 309.

Figure 13:
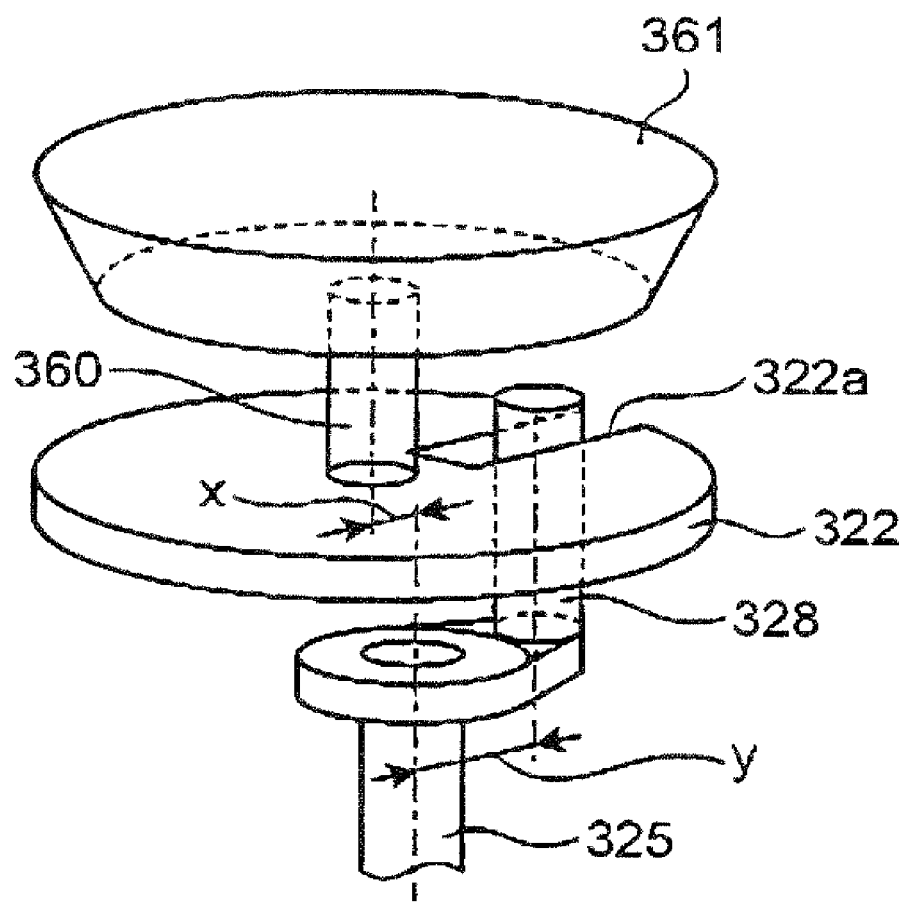
FIG. 13 is a schematic diagram illustrating details of a gearbox shown in FIG. 12.

As shown in FIG. 13, a cam 322 is mounted on a bottom end of the drive axis 360. The cam 322 has a disk shape, and includes a long groove 322a extended in a radial direction from the vicinity of the center of rotation of the cam 322. An actuator pin (link pin) 328 is movably fitted in the long groove 322a. As shown in FIG. 13, the actuator pin 328 is mounted with eccentricity Y on an end of a rotation axis 325 whose center is shifted by X from the center of the drive axis 360. When the rotation axis 325 rotates one turn, the actuator pin 328 rotates around the rotation axis 32.

The above configuration is described will be detail below with reference to FIGS. 14A to 14D. FIGS. 14A to 14D are schematic diagrams illustrating a relation between the actuator pin 328 and the cam 322.

Figure 14A:
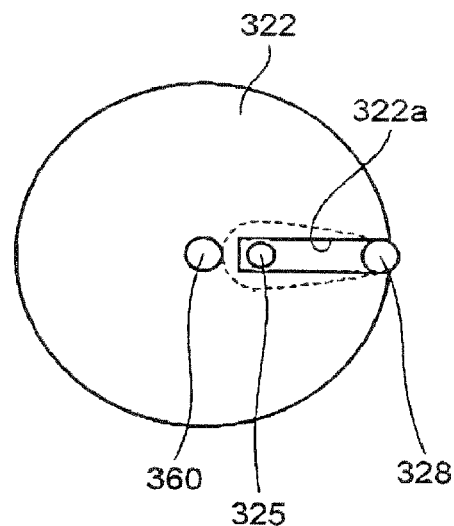
FIG. 14A is a schematic diagram illustrating a relation between a cam and an actuator pin in a standby state.

As shown in FIG. 14A, in a standby state before operation of rotating a rotation axis is started, the actuator pin 328 is located farthest from the drive axis 360. When the switching operation is started, an operating force is transmitted to the rotation axis 325, the actuator pin 328, the cam 322, the drive axis 360, the bevel gear 361, and the driven gear 313 (the revolving-nosepiece rotating unit 312) in this order, so that force for releasing the ball 316 from the groove of the click 315 in the click mechanism 314 is exerted. At this time, the actuator pin 328 presses the cam 322 at a position farthest from the drive axis 360, so that the drive axis 360 can be rotated with a relatively small operating force.

Figure 14B:
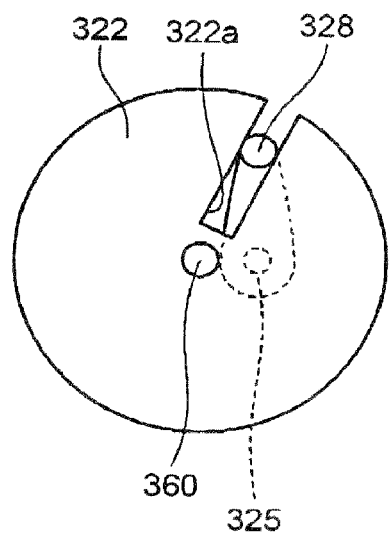
FIG. 14B is a schematic diagram illustrating a relation between the cam and the actuator pin when a rotation axis is rotated one-quarter of a turn.

As shown in FIG. 14B, when the rotation axis 325 is rotated one-quarter of a turn clockwise, the actuator pin 328 gradually comes closer to the drive axis 360. However, because the ball 316 has been released from the click 315, the drive axis 360 can be rotated with a small operating force.

Figure 14C:
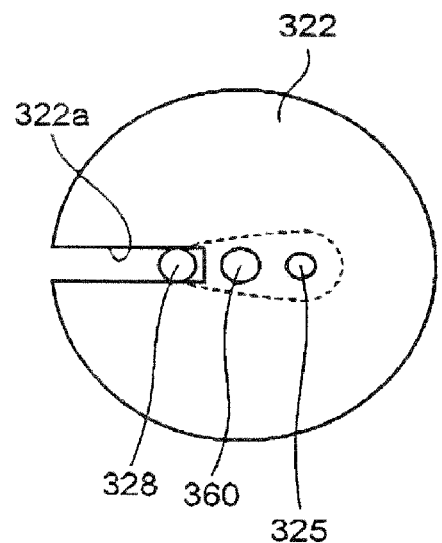
FIG. 14C is a schematic diagram illustrating a relation between the cam and the actuator pin when the rotation axis is rotated half a turn.

When the rotation axis 325 is further rotated one-quarter of a turn clockwise (half a turn in total), as shown in FIG. 14C, the actuator pin 328 comes closest to the drive axis 360. However, because the ball 316 is already released from the click 315, the drive axis 360 can be largely rotated with a small operating force.

Figure 14D:
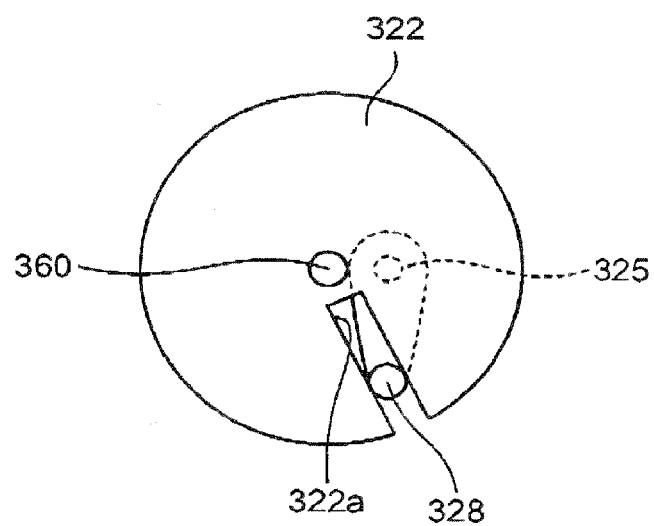
FIG. 14D is a schematic diagram illustrating a relation between the cam and the actuator pin when the rotation axis is rotated three-quarters of a turn.

When the rotation axis 325 is further rotated one-quarter of a turn clockwise (three-quarters of a turn in total), a force for putting the ball 316 in the click 315 is exerted. At this time, as shown in FIG. 14D, the actuator pin 328 gradually comes away from the drive axis 360. Therefore, the drive axis 360 can be largely rotated with a relatively small operating force.

As shown in FIG. 12, a driven pulley 370 is mounted on a bottom end of the rotation axis 325. An operation dial (optical-element switching operating unit) 380 is rotatably mounted inside the microscope main body 301 (a casing) such that a portion of the operation dial 380 is exposed from the left side surface of the microscope main body 301. A drive pulley 381 is coaxially mounted on the operation dial 380 such that the drive pulley 381 rotates along with rotation of the operation dial 380.

A belt 371 is wound around the drive pulley 381 and the driven pulley 370 described above such that when the drive pulley 381 rotates one-quarter of a turn, the driven pulley 370 rotates one turn. An operating force exerted via the operation dial 380 is transmitted to the driven pulley 370, so that the rotation axis 325 is rotated.

Figure 15:
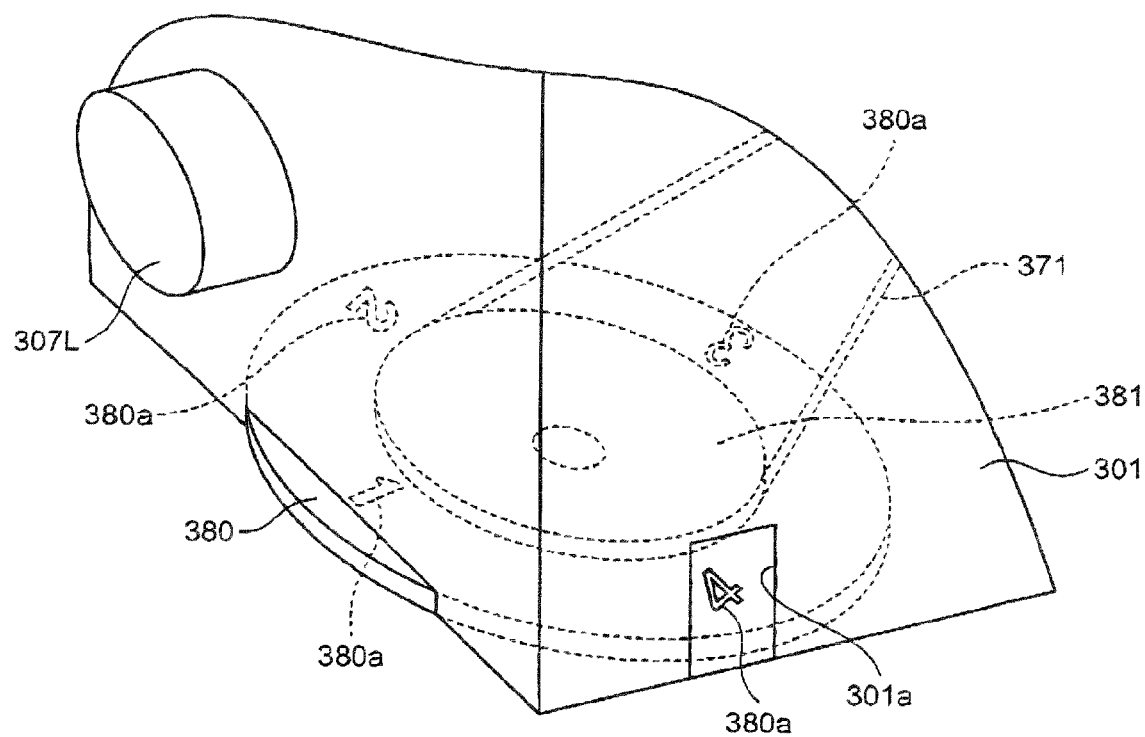
FIG. 15 is a schematic diagram illustrating a front surface of the inverted microscope shown in FIG. 12

Mounting position numbers 380a for the objective lenses 305 are provided on a top surface of the operation dial 380 in a manner corresponding to the objective lenses 305. The mounting position numbers 380a are, as shown in FIG. 15, provided so that they can be viewed from a small opening 301a formed on the front surface of the microscope main body 301. Therefore, the objective lens 305 being used can be identified by checking the mounting position numbers 380a.

The revolving nosepiece 310 of the microscope according to the fourth embodiment described above is configured to enable switching of the objective lenses 305 from one to the other by rotating the operation dial 380 that is mounted such that a portion thereof is exposed near the focusing handle 307L. Therefore, operation posture for the microscope is not disturbed.

Furthermore, the revolving nosepiece 310 of the microscope according to the fourth embodiment described above can reduce, similarly to the revolving nosepiece 10 of the microscope according to the first embodiment, an operating force used when the ball 316 is released from the click 315 and when the ball 316 is fitted in the click 315.

The optical-element switching device of the microscope (hereinafter, referred to as "microscope optical-element switching device") shown above has features as described in the following notes 1 to 9.

(Note 1)

A microscope optical-element switching device that includes a main body, a movable member movably mounted on the main body and equipped with a plurality of optical elements, and a click mechanism provided between the main body and the movable member and configured to regulate a stop position of the movable member, the optical-element switching device including:

a cam rotatably mounted on the main body via a rotation axis, having a cam surface extended in a substantially radial direction from the rotation axis, and configured to move the movable body when the cam surface is pressed;

a link rotatably mounted at a position distant from the rotation axis of the cam; and a link pin mounted on a distal end of the link distant from a center of rotation of the link in a radial direction, the link pin configured to press the cam surface while moving along the cam surface in the substantially radial direction, wherein the link pin presses the cam surface at a position distant from the rotation axis of the cam in the radial direction within a movable range of the link pin just after rotation of the link has started and just before the rotation of the link ends.

The microscope optical-element switching device described above includes the cam rotatably mounted on the main body via the rotation axis and configured to move the movable body when the cam surface extended in the substantially radial direction from the rotation axis is pressed, the link rotatably mounted at the position distant from the rotation axis of the cam, and the link pin mounted on the distal end of the link distant from the center of rotation of the link in the radial direction and configured to press the cam surface while moving along the cam surface in the substantially radial direction. In the microscope optical-element switching device, the link pin presses the cam surface at the position distant from the rotation axis of the cam in the substantially radial direction within the movable range of the link pin just after rotation of the link has started and just before the rotation of the link ends. Therefore, magnitude of operating force to be used just after switching of the optical elements has started and just before switching of the optical elements ends can be reduced. As a result, switching operation of the optical elements can be performed easily.

(Note 2)

The microscope optical-element switching device according to note 1, wherein the movable member moves so that the optical elements can be switched from one to the other when the cam rotates one-quarter of a turn.

(Note 3)

The microscope optical-element switching device according to note 1, wherein the movable member moves so that the optical elements can be switched from one to the other when the cam rotates one turn.

(Note 4)

The microscope optical-element switching device according to any one of notes 1 to 3, further including an internal gear fixed to the main body such that a center of the internal gear coincides with the rotation axis of the cam;

a gear portion mounted on a circumference of the link and engaged with the internal gear; and a switching lever rotatably mounted in a concentric manner with respect to the rotation axis of the cam and on which the link is rotatably mounted, wherein when the switching lever is rotated, the link moves around the rotation axis of the cam while rotating around a rotation axis of the link.

(Note 5)

The microscope optical-element switching device according to any one of notes 1 to 4, further including a driving gear engaged with a driven gear mounted on the movable member, wherein the cam causes the driving gear to rotate.

(Note 6)

The microscope optical-element switching device according to note 5, wherein the ling includes a link stopper, the driving gear includes a gear stopper, and the link stopper and the gear stopper are brought into contact with each other to prevent overrun of the movable member.

(Note 7)

The microscope optical-element switching device according to note 4, wherein the switching lever is connected to an operation lever mounted near a focusing handle via a four-bar linkage.

(Note 8)

The microscope optical-element switching device according to note 1, wherein the link pin causes the cam to rotate intermittently in a single direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

That is claimed is:

1. A microscope comprising:
   a microscope main body;
   a movable member rotatably mounted on the microscope main body and equipped with a plurality of optical elements;
   a focusing operating unit that adjusts focal points of the optical elements;
   an optical-element switching operating unit mounted in a vicinity of the focusing operating unit and comprising an operation knob configured to move by a predetermined amount; and
   an operating-force transmitting mechanism provided between the optical-element switching operating unit and the movable member and configured to transmit, when the operation knob moves, an operating force to the movable member to rotate the movable member such that the optical elements are switched from one to another through a single translatory operation of the operation knob by the predetermined amount;
   wherein the operating-force transmitting mechanism further comprises a cam and a plurality of links that connect the cam and the operation knob.

2. The microscope according to claim 1, wherein the optical-element switching operating unit comprises a first operation knob configured to move by the predetermined amount and a second operation knob configured to move by a substantially same amount and in a substantially same direction as the first operation knob, and
   wherein the operating-force transmitting mechanism causes the movable member to move in a first direction when the first operation knob is moved, and in a second direction opposite to the first direction when the second operation knob is moved.

3. The microscope according to claim 2, wherein the first operation knob and the second operation knob are arranged in a substantially vertical direction at a rear side of the focusing operating unit with respect to an operator.

4. The microscope according to claim 2, wherein the first operation knob is configured to move frontward toward an operator by the predetermined amount.

5. The microscope according to claim 1, wherein the predetermined amount by which the operation knob moves is set in a range from 30 millimeters to 70 millimeters.

6. The microscope according to claim 1, wherein a plurality of the operation knobs are provided and mounted on respective left and right side surfaces of the microscope main body.

7. The microscope according to claim 1, wherein the operation knob is configured to move frontward toward an operator by the predetermined amount.

8. The microscope according to claim 1, wherein the movable member comprises one of a revolving-nosepiece rotating unit and a turret.

* * * * *